United States Patent [19]

Sutton et al.

[11] Patent Number: 4,649,499

[45] Date of Patent: Mar. 10, 1987

[54] TOUCHSCREEN TWO-DIMENSIONAL EMULATION OF THREE-DIMENSIONAL OBJECTS

[75] Inventors: Jimmy Sutton, Santa Clara; Wanda Shearer, Lafayette; Karlie J. Arkin, Santa Clara; Jeffrey A. Spoelstra, San Jose; Steven M. Weiss, Sunnyvale; Sherry L. Ramsey, Los Altos; Kyle Hurlbut, San Jose; W. Bruce Culbertson, Palo Alto; Robert R. Burns, Santa Clara, all of Calif.

[73] Assignee: Hewlett-Packard Company, Palo Alto, Calif.

[21] Appl. No.: 586,954

[22] Filed: Mar. 7, 1984

[51] Int. Cl.⁴ .................. G08C 9/00; G06F 15/62
[52] U.S. Cl. .................................. 364/518; 178/18; 340/712
[58] Field of Search ............... 364/518, 521, 146, 171; 178/18, 19; 340/707, 709, 712; 250/221, 549

[56] References Cited

U.S. PATENT DOCUMENTS

| 580,408 | 2/1984 | Straton et al. | |
|---|---|---|---|
| 4,293,734 | 10/1981 | Pepper, Jr. | 178/18 |
| 4,386,232 | 5/1983 | Slater | 178/18 |
| 4,451,895 | 5/1984 | Sliwkowski | 340/712 X |
| 4,475,104 | 10/1984 | Shen | 364/521 X |
| 4,476,463 | 10/1984 | Ng et al. | 178/18 X |
| 4,484,179 | 11/1984 | Kasday | 340/712 X |
| 4,516,112 | 5/1985 | Chen | 340/712 X |

OTHER PUBLICATIONS

Carroll, "Put the Touch on Hewlett-Packard".
Elographics, Inc., "E270 Transparent Position Sensor", Form No. E170PL-1/79.
TransFlex, The Transparent TouchSwitching Systems from Sierracin, data sheet.
TSD Display Products, Inc., Touch Screen Digitizer, Model TSD15C, data sheet.

*Primary Examiner*—Parshotam S. Lall
*Assistant Examiner*—H. R. Herndon
*Attorney, Agent, or Firm*—Douglas L. Weller

[57] ABSTRACT

Computer programs are provided which utilize a touchscreen to emulate three-dimensional objects on a two-dimensional computer screen. One program, called personal cardfile (PCF), combines the convenience of a desktop rotary cardfile with the power of a computerized product. PCF presents an image of a rotary file, complete with "knobs" for flipping through "cards" in a cardfile, and "tabs" for selecting "cards" to be represented individually on the touchscreen. Another program, called financial computer (FC), emulates an HP12C handheld financial calculator. The HP12C calculator is manufactured by Hewlett-Packard Company, Palo Alto, Calif. On a computer touchscreen, an operator sees a familiar looking "calculator" and touches its "keys" to operate it, just as for a conventional three-dimensional calculator.

9 Claims, 5 Drawing Figures

TOUCHSCREEN TWO-DIMENSIONAL EMULATION OF THREE-DIMENSIONAL OBJECTS

Microfiche Appendices A and B set forth programs written in accordance with preferred embodiments of the present invention. Appendix A includes 8 microfiche sheets for a total of 734 frames. Appendix B includes 2 microfiche sheets for a total of 161 frames.

BACKGROUND OF THE INVENTION

The increasing proliferation and utility of computers and computing devices and the spread of their use by persons with non-technical backgrounds require the design of "user-friendly" computer interfaces. One recent improvement in computer interfaces has been in the area of "touchscreen" data input (see copending patent application filed Feb. 15, 1984 by Peter Riley Straton and Scott Robert McClelland entitled INTELLIGENT PROGRAMMABLE TOUCHSCREEN SYSTEM, Patent Office Ser. No. 580,408 filed 02/15/84 now U.S. Pat. No. 4,587,630. The present invention relates to the use of touchscreen technology to make further improvements in computer/human interfaces.

SUMMARY OF THE INVENTION

In accordance with the preferred embodiments of the present invention there are presented computer programs which utilize a touchscreen to emulate three-dimensional objects on a two-dimensional computer screen.

In one embodiment of the present invention, a personal cardfile (PCF) is presented which combines the convenience of a desktop rotary cardfile with the power of a computerized product. PCF presents an image of a rotary file, complete with "knobs" for flipping through "cards" in a cardfile, and "tabs" for selecting "cards" to be represented individually on the touchscreen. Once a card is selected, PCF emulates the ability of a rotary cardfile to display information contained by individual cards.

In a second embodiment of the present invention, an emulation of a handheld calculator is presented. The handheld calculator emulated is in the example shown the HP12C Financial Calculator manufactured by Hewlett-Packard Co. of Palo Alto, Calif. On the computer touchscreen, an operator sees a familiar looking "calculator" and touches its "keys" to operate it, just as for a conventional three-dimensional calculator.

DESCRIPTION OF THE PREFERRED EMBODIMENTS

Figure 1:
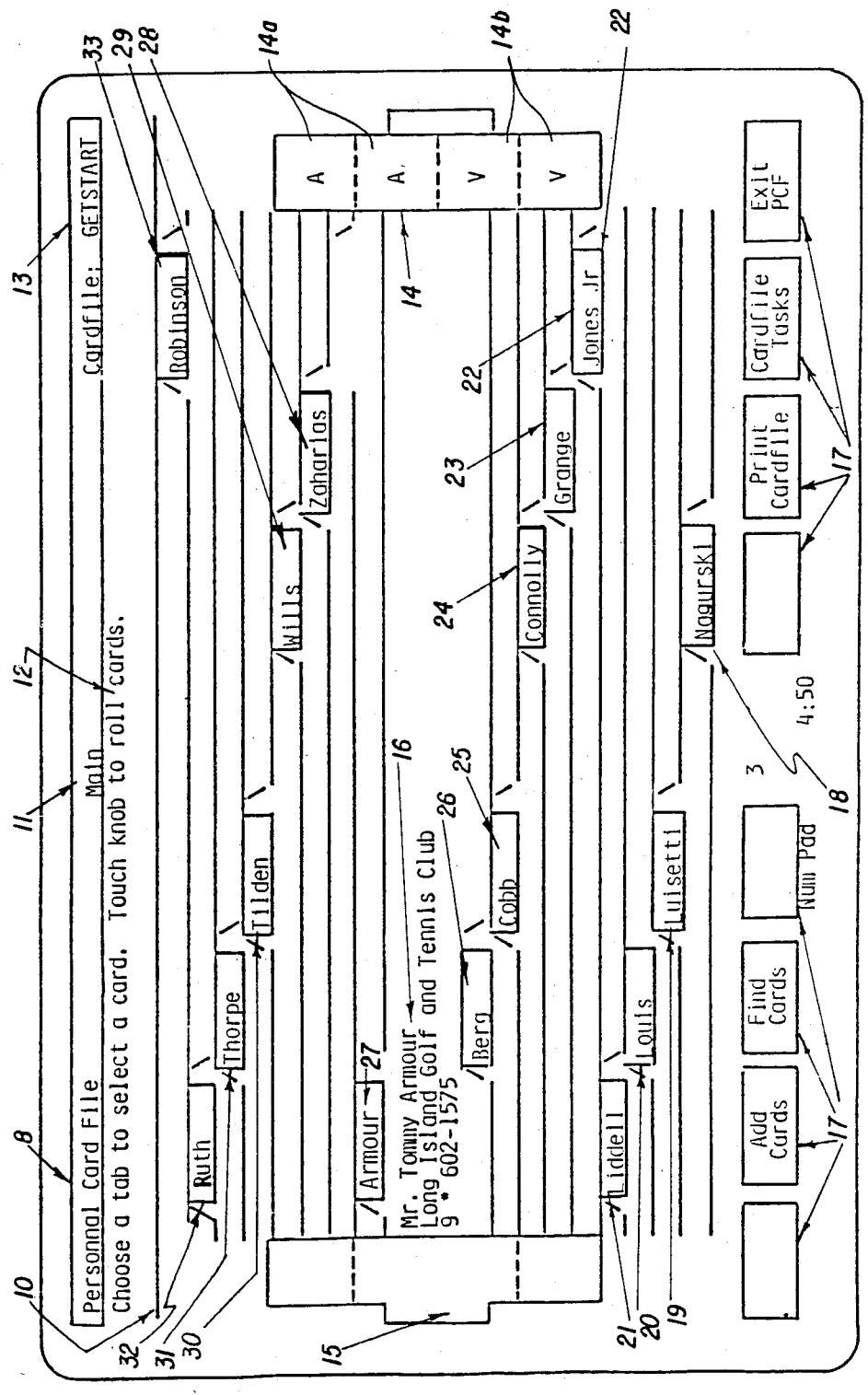
FIG. 1 is a display on a computer touchscreen of a rotary cardfile in accordance with a preferred embodiment of the present invention.

FIG. 1 shows output from a program called "Personal Card File" (PCF) as it appears on a personal computer touchscreen display. PCF emulates a rotary cardfile. A series of tabs, 18 through 33 are similar in function to tabs on an actual rotary cardfile. Each tab 18–33 contains a label, such as the label "Cobb" on tab 25. Also, each tab 18–33 has associated with it a "card" which contains stored information. For instance, associated with tab 27, an open card 16, has the name, address and phone number of a "Mr. Tommy Armour".

By touching a knob 14 or a knob 15, an operator can "roll" the PCF output. This is equivalent to "rolling" a rotary cardfile. For instance, if the operator touches an upper region 14a of knob 14, PCF rolls upward. If PCF is rolled upward one card, tab 33 disappears from the touchscreen and tabs 18–32 all incrementally move up in position on the touchscreen. A new tab is display at bottom of the tabs, beneath tab 18. Also, tab 26 now replaces the slot held by tab 27, and thus a new open card is display which is associated with tab 26.

Similarly, if the operator touches a lower region 14b of knob 14, PCF rolls downward. A downward roll is similar to upward roll, except that the tabs are rotated downward, the lowest tab disppears from the touchscreen, a new tab appears on the top of the touchscreen, and all the cards incrementally move down in position on the touchscreen.

In addition to areas on the touchscreen which directly correspond to parts of an actual rotary cardfile, there are additional areas on the touchscreen which offer aids to the operator. For instance a title area 8 tells the operator that he is running Personal Card File (PCF). A label area 11 indicates he is in a module of PCF called "Main". Another label area 13, indicates which set of computer data files contains the information that is being displayed by PCF.

Additionally, a series of softkeys 17, which have been predefined by PCF, allow the operator to issue instructions merely by touching softkeys 17. For instance, the operator could exit the PCF program, issue print commands to a line printer, or initiate the addition of new cards, all by merely touching one or more of labeled softkeys 17.

Figure 2:
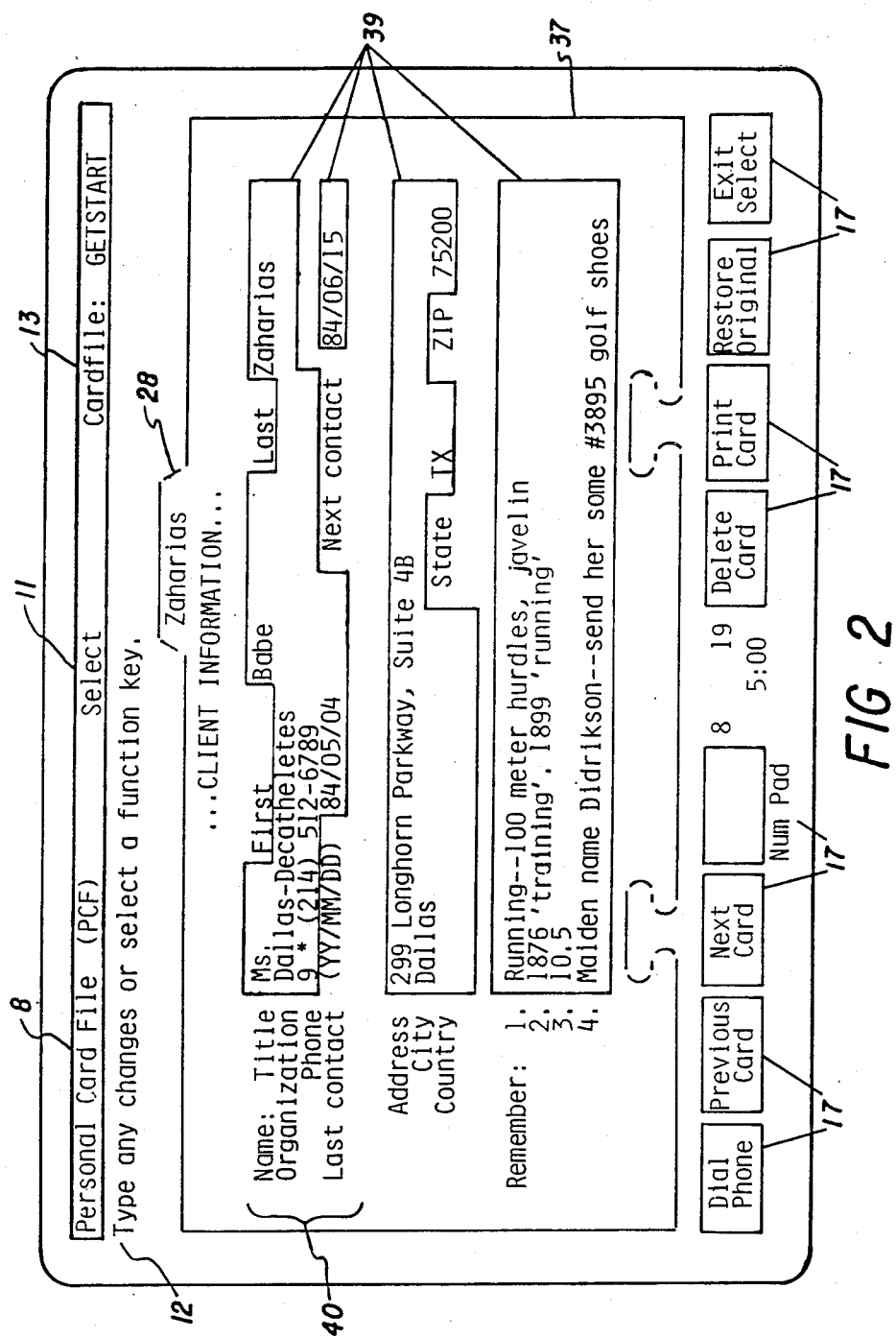
FIG. 2 is a display on a computer touchscreen of one card from the rotary cardfile shown in FIG. 1 in accordance with a preferred embodiment of the present invention.

A prompt line 12 prompts the operator as to certain actions he may take. For instance a prompt "Touch knob to roll cards" is shown in FIG. 2. Another prompt, "Choose a tab to select a card", is also displayed. This last prompt informs the operator that by touching one of tabs 18–33, an entire card associated with the tab touched will be displayed.

For instance, if the operator were to touch tab 28, a card 37 shown in FIG. 2 associated with tab 28 would appear on the touchscreen. FIG. 2 shows card 37 along with the rest of a new output which appears on the touchscreen display when tab 28 is touched.

Card 37 includes tab 28, label fields 40 and data fields 39. Label fields 40 are the same for every card in a particular cardfile. Data field 39 contains information particular to card 37. Also displayed on the touchscreen are title area 8, label areas 11 and 13, softkeys 17, and prompt line 12. Label area 11 reads "Select" indicating that a user has selected a particular card and may perform operations relevant to single cards, e.g. he may edit data fields 39, print card 37 on a printer, or delete card 37. Softkeys 17 contain a particular set of instructions available to the operator who is in the module "Select".

Figure 3:
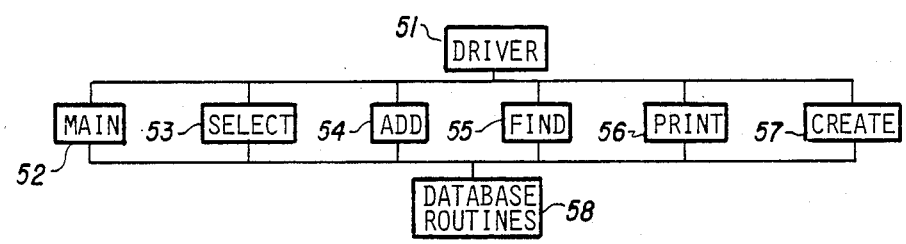
FIG. 3 is a block diagram of programming modules for a program which implements the rotary cardfile of FIG. 1 and FIG. 2.

In FIG. 3 a block diagram of modules within PCF are shown. A Driver module 51 selects one of six modules, Main 52, Select 53, Add 54, Find 55, Print 56 or Create 57, to run. Each module 52–57 can call data base routines 58 to perform various functions. When the selected module from modules 52–57 finishes running, it returns to Driver module 51 certan variables, which Driver 51 utilizes to select another module 52–57 to run.

In Appendix A is included a complete listing of computer programs (Copyrighht 1983 Hewlett-Packard Company) for PCF. The computer programs listed are designed to run as an application program on an HP150 personal computer manufactured by Hewlett-Packard Co.

Figure 4:
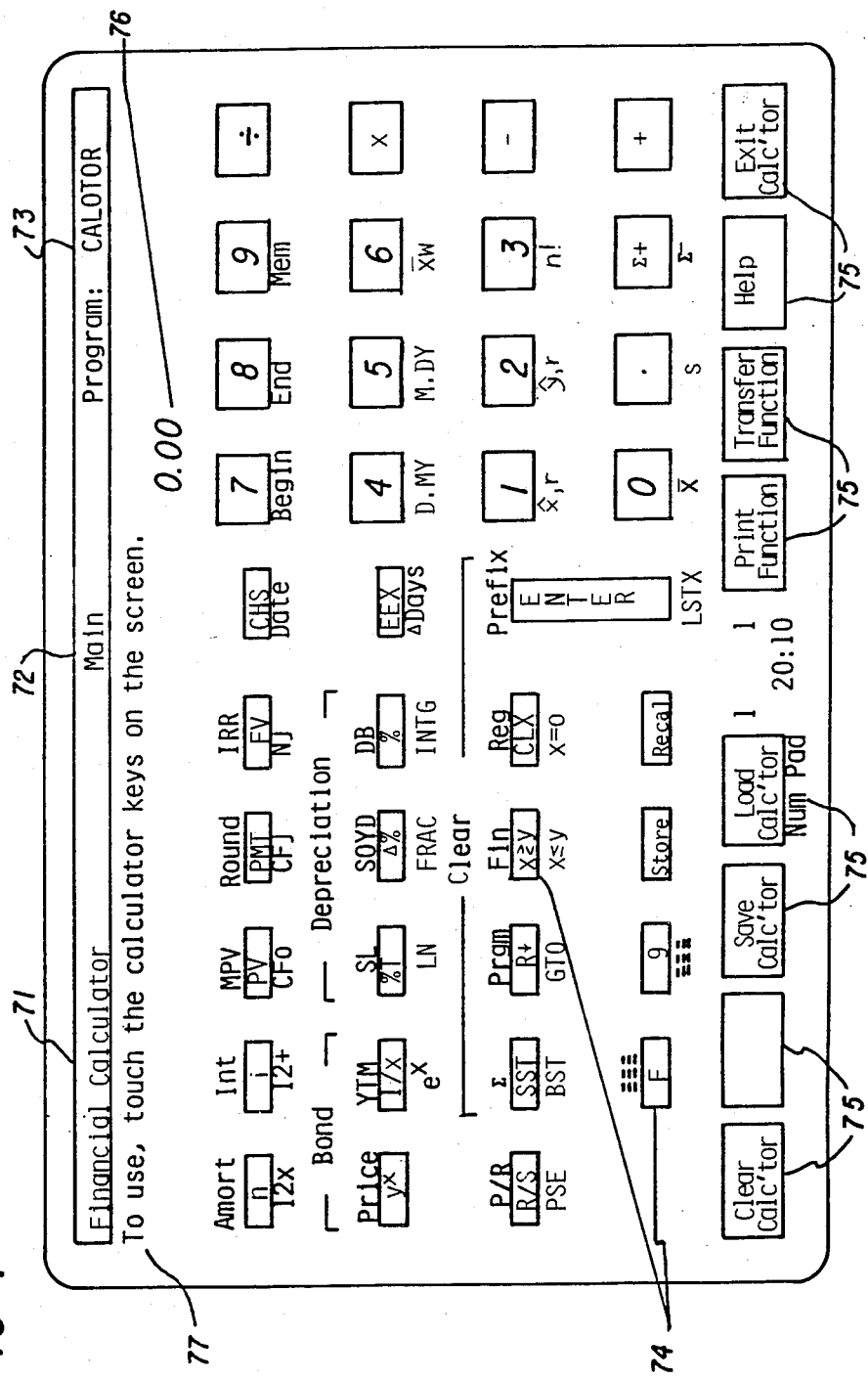
FIG. 4 is a display on a computer touchscreen of an emulated HP12C Financial Calculator in accordance with a preferred embodiment of the present invention.

FIG. 4 shows output from a program called "Financial Calculator" (FC), as it appears on an HP150 personal computer touchscreen display. FC emulates an HP12C handheld calculator. Shaded regions called "keys", for example keys 74, correspond to the physical keys on an HP12C calculator. A "display" 76 corresponds to a physical display on an HP12C.

The emulated calculator shown in FIG. 4 functions just like an actual HP12C. Numbers are entered into the emulated calculator by touching the keys numbered 0, 1, 2, 3, 4, 5, 6, 7, 8, and 9. Operations on entered numbers are performed by touching function keys, such as keys 74, or sequences of function keys. The emulated calculator performs calculations exactly like the HP12C handheld calculator.

In additional to areas on the touchscreen which directly correspond to parts of an HP12C handheld calculator, there are additional areas on the touchscreen which offer aids to the operator. For instance, title area 71 tells the operator that he is running Financial Calculator (FC). A label area 72 indicates he is in a module of FC called "Main". Another label area 73 indicates the program file he is accessing is called "Calctor".

Additionally, a series of programmable softkeys 75 allow the operator to issue instruction merely by touching softkeys 75. For instance, an operator could exist (by depressing the softkey labelled "Exit") the FC program or ask for information on how the calculator operates (by depressing the softkey labelled "Help") by merely touching the various labeled softkeys 75.

A prompt line 77 prompts the operator as to certain of his options. The currently displayed prompt line tells the operator: "To use, touch the calculator keys on the screen."

Figure 5:
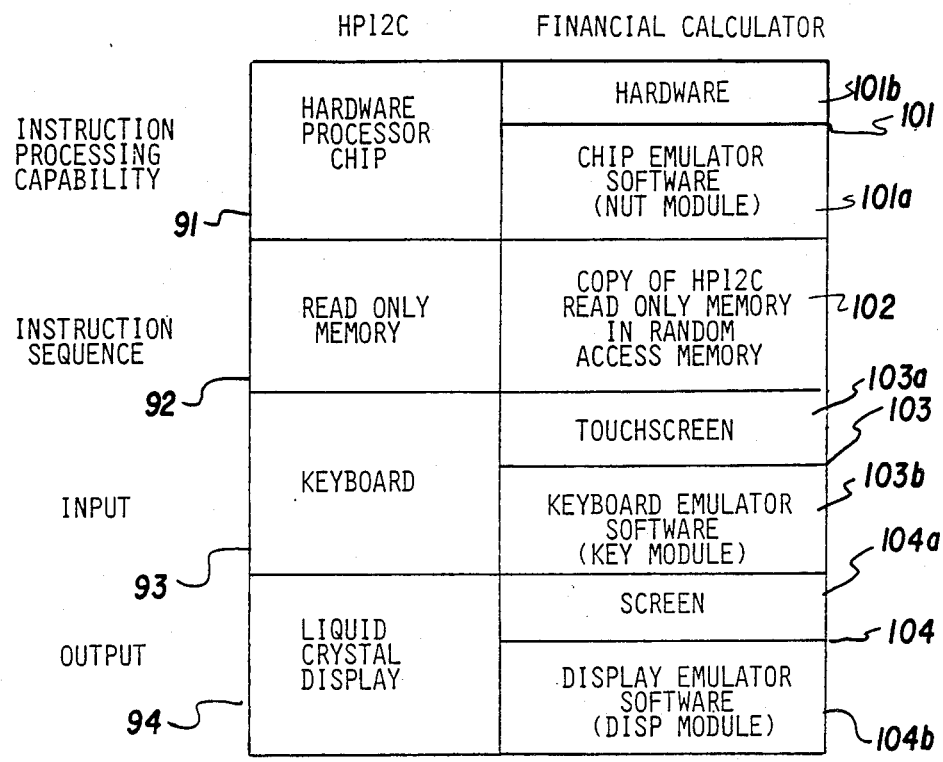
FIG. 5 shows programming emulation modules for a program which implements the emulated HP12C Financial Calculator of FIG. 4.

FIG. 5 shows FC programming modules juxtaposed for functionally equivalent entities within the HP12C. In the HP12C, instruction processing is done with a Hardward Processor Chip 91. Sequences of instructions are stored in a a read only memory (ROM) 92. Input is done by a keyboard 93. Output is done by means of a liquid crystal display 94.

In the HP12C, microprocessor 91 continuously runs a program stored in ROM 92. Microprocessor 91 executes a set of instructions. These instructions include, for example, instructions to store, recall and manipulate data, instructions to sense if keys have been struck, and instructions to turn on and off numbers on liquid crystal display 94. Within ROM 92 instructions are carefully sequenced to be able to carry out each function represented by a function key on HP12C keyboard 93.

In the FC program, instruction processing is done with a chip emulator 101. Chip emulator 101 consists of a chip emulator software (Nut) module 101a and Host computer hardware 101b, for example HP150 personal computer hardware. Chip emulator 101 can process instructions stored by a memory module 102.

Memory module 102, stores sequences of instructions in random access memory (RAM). The sequences of instructions stored by memory module 102 is an exact copy of the sequences of instructions stored by the HP12C in ROM 92. These instructions, when processed by chip emulator 101, allow the FC program to precisely duplicate the performance of the HP12C personal computer.

Input for the FC program is done by means of an input module 103. Input module 103 includes a touchscreen 103a, such as a touchscreen on an HP150 personal computer, and a keyboard emulator software (Key) module 103b. Output is done by means of an output module which includes a computer video screen 104a, such as a touchscreen on an HP150 personal computer, and a display emulator software (Disp) module 104b.

In Appendix B is included a complete listing of computer programs (Copyright 1983 by Hewlett-Packard Company) for FC. The computer programs are designed to run as an application program on an HP 150 personal computer.

What is claimed is:

1. An apparatus for providing a two dimensional representation of a three dimensional object and allowing a user to interact with the two dimensional representation, the apparatus comprising:
   a computer with a video screen;
   computer programming means coupled to the computer for providing a two-dimensional reproduction of the three-dimensional object on the computer video screen; and,
   touchscreen interaction means coupled to the computer for allowing an operator to interact with the computer programming means by touching the two-dimensional reproduction wherein such interaction is substantially similar to the way the user would interact with the three dimensional object.

2. An apparatus as in claim 1 wherein the object is a personal cardfile.

3. An apparatus as in claim 2 wherein the two-dimensional reproduction includes tabs and file cards.

4. An apparatus as in claim 2 wherein the two-dimensional reproductions includes a knob means for touching to cause new tabs and file cards to be displayed.

5. An apparatus as in claim 2 additionally comprising interface means coupled to the computer for allowing the operator to interact with the computer programming means by touching portions of the video screen which are not part of the two-dimensional reproduction.

6. An apparatus as in claim 1 wherein the object is a calculator.

7. An apparatus as in claim 6 wherein the computer programming means includes:
   chip substitution means for substituting for a processor within the calculator wherein the chip substitution means receives input similar to input the processor would receive and produces output similar to the output the processor would provide; and, instruction sequencing means coupled to the chip substitution means for storing instruction sequences to be performed by the chip substitution means, and wherein, the instruction sequences are exactly the same instruction sequences as those which are performed by the processor.

8. An apparatus as in claim 6 wherein the computer programming means includes:

chip substitution means for emulating a processor within the calculator wherein the chip substitution means receives input similar to input the processor would receive and produces output similar to the output the processor would provide; and, instruction sequencing means coupled to the chip substitution means for storing instruction sequences to be performed by the chip substitution means, and wherein, the instruction sequences are substantially similar to instruction sequences performed by the processor.

9. An apparatus as in claim 6 additionally comprising interface means coupled to the computer for allowing the operator to interact with the computer programming means by touching portions of the video screen which are not part of the two-dimensional reproduction.

* * * * *